United States Patent

Lonergan et al.

[11] Patent Number: 5,804,233
[45] Date of Patent: Sep. 8, 1998

[54] ICE RESISTANT FROZEN DOUGH, AND METHOD OF MAKING

[75] Inventors: Dennis Lonergan, Medina; Michelle Larsen, Woodbury; RoseBud Sierzant, Minneapolis, all of Minn.

[73] Assignee: The Pillsbury Company, Minneapolis, Minn.

[21] Appl. No.: 642,703

[22] Filed: Jun. 3, 1996

Related U.S. Application Data

[63] Continuation-in-part of Ser. No. 477,216, Jun. 7, 1995, Pat. No. 5,672,369.

[51] Int. Cl.$^6$ .............................. A21D 2/18; A21D 6/00; A21D 10/02

[52] U.S. Cl. .......................... 426/19; 426/128; 426/524; 426/549; 426/62

[58] Field of Search .............................. 426/19, 62, 524, 426/128, 549, 27

[56] References Cited

U.S. PATENT DOCUMENTS

| | | | |
|---|---|---|---|
| 3,208,855 | 9/1965 | Enoch et al. | 99/90 |
| 3,435,632 | 4/1969 | Falilin | 62/322 |
| 3,450,542 | 6/1969 | Badran | 99/154 |
| 3,894,155 | 7/1975 | Ono et al. | 426/25 |
| 4,335,584 | 6/1982 | Lermuzeaux | 62/388 |
| 4,366,178 | 12/1982 | Reynolds et al. | 426/393 |
| 4,374,151 | 2/1983 | Lindstrom et al. | 429/19 |
| 4,381,315 | 4/1983 | Yong et al. | 426/94 |
| 4,414,228 | 11/1983 | Larson et al. | 426/19 |
| 4,526,801 | 7/1985 | Atwell | 426/128 |
| 4,550,026 | 10/1985 | Ando | 426/316 |
| 4,743,452 | 5/1988 | Felske et al. | 426/19 |
| 4,847,104 | 7/1989 | Benjamin et al. | 426/549 |
| 5,059,432 | 10/1991 | Berkowitz et al. | 429/19 |
| 5,094,859 | 3/1992 | Sluimer | 426/19 |
| 5,171,590 | 12/1992 | Sluimer | 429/19 |
| 5,314,702 | 5/1994 | Lewandowski et al. | 426/128 |
| 5,366,744 | 11/1994 | Drummond et al. | 426/128 |
| 5,451,417 | 9/1995 | Freyn et al. | 426/524 |
| 5,672,369 | 9/1997 | Longeron et al. | 426/128 |

FOREIGN PATENT DOCUMENTS

| | | |
|---|---|---|
| 0620974 | 10/1994 | European Pat. Off. . |
| 2657827 | 6/1978 | Germany . |

OTHER PUBLICATIONS

American Association of Cereal Chemists, Inc., Edited by: Kulp, Karel; Lorenz, Klaus; and Brummer, Juergen; *Frozen & Refrigerated Doughs and Batters,* 1995, pp. vii and viii; 123–125; 250–253; 279.

American Association of Cereal Chemists, Inc., Hoseney, R. Carl; *Principles of Cereal Science and Technology, Section Edition,* 1986, 1994; pp. 267–268; 303–356; 374.

*Primary Examiner*—Helen Pratt
*Attorney, Agent, or Firm*—Aleya Rahman; Janal M. Kalis

[57] ABSTRACT

The present invention includes a method for making a bread dough that remains unfrozen at a temperature as low as 0 degrees Fahrenheit and that has a specific volume and flavor, when baked after storage at freezing temperatures, that is substantially the same as bread baked from a nonfrozen dough not subjected to storage. The present invention also includes a pre-proofed, uncooked dough that is provided with improved storage stability.

19 Claims, 9 Drawing Sheets

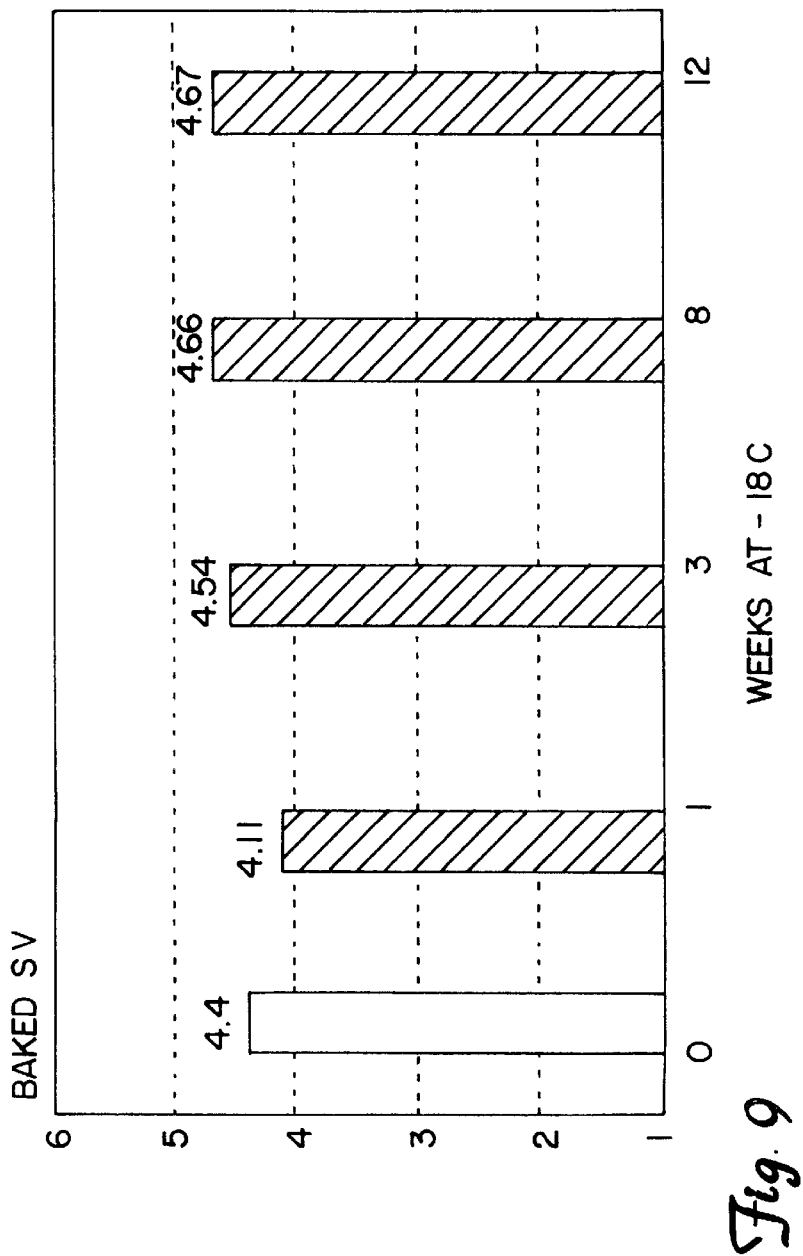

ICE RESISTANT FROZEN DOUGH, AND METHOD OF MAKING

This application is a continuation-in-part of U.S. application Ser. No. 08/477,216 filed Jun. 7, 1995 now U.S. Pat. No. 5,672,369.

BACKGROUND OF THE INVENTION

The present invention relates to a method for making a dough that is substantially ice-free at a temperature as low as 0° F. (−18° C.) and a product baked from the dough. The present invention also relates to a method for making a dough storable at freezing temperatures that bakes to a bread having a specific volume that is about the same as a bread baked from a dough that has never been frozen.

In making bakery items, for example, bread, rolls, pastry, etc., a multi-step process is used. The process is labor and machinery-intensive and is also time consuming. Dough can be produced in one of several conventional manners, for example, by the sponge method or the straight-dough method. In the sponge method, yeast, yeast food, water, some flour, and sucrose are mixed and then held to allow the yeast time to begin fermentation and to produce carbon dioxide and ethanol. Thereafter, remaining flour, some additional water, and minor dry ingredients are mixed with the preceding blend to form the dough, after which the dough is processed, for example, by sheeting or other known processing techniques. After forming the dough into its final form, the dough is proofed and then subsequently cooked, for example, by baking or frying.

The sponge method of dough preparation is generally considered to be better because this method makes a dough of better flavor and is considered a "standard" dough-making procedure. However, the sponge method takes longer than other dough-making procedures. The entire process, including proofing, can take up to eight hours.

Another dough manufacturing process is a straight-dough process. The straight-dough process includes a step of mixing all of the flour, minor dry ingredients, water, yeast food and yeast. The dough is mixed and fermented for zero to sixty minutes, readied for forming, cut and formed into an appropriate shape and then proofed. One advantage of the straight-dough method is that it is quicker than the sponge method and requires less equipment. It generally does not make a bread of the same flavor and generally does not provide the same quality as bread made by the sponge method. Even though the straight-dough method is quicker than the sponge method, this method can take up to four hours to complete sufficient proofing.

A third process of manufacturing dough is a continuous process. Typically, a pre-ferment, comprising a fermented slurry of yeast, water, yeast food and some sugar and flour is combined with remaining dough ingredients, continuously mixed, cut into the appropriate size and shape and proofed. This particular method of dough manufacture is infrequently used because it is considered by the industry to produce a low quality, low-flavor baked product and is equipment intensive.

The above processes have been used for a number of years, both in industry and in the home in simplified forms. As described, the processes are equipment and time intensive. There has been a recent interest in providing fresh-baked products to consumers, as is evidenced by an increased number of in-store bakeries. These bakeries provide fresher products than those delivered from a plant to the store. The time and equipment necessary to produce such products on site is somewhat prohibitive, however. It would, therefore, be desirable to eliminate the dough preparation and final proofing steps at the store, leaving it to the bakery to merely bake or otherwise cook the product.

Frozen doughs made by the methods described have become increasingly popular for consumers over the past decade. This popularity is related to improvements in organoleptic properties of breads made with frozen dough. These improvements are due, in part, to retention of yeast viability and retention of gassing power during a frozen storage of a dough.

There remain, however, areas where improvements have not been forthcoming. One of these areas relates to a reduction in stability of a dough matrix after freezing and thawing the dough. This reduction in stability typically produces a baked bread product having a specific volume that is less than a bread made with non-frozen dough. This bread with reduced specific volume has a "doughy" flavor and mouthfeel. Baked bread quality, exhibited by features such as texture, consistency and specific volume, deteriorates because of the shipping and storage conditions, particularly freeze-thaw cycles of the frozen dough.

One attempt to solve problems with frozen bread doughs is described in U.S. Pat. No. 4,374,151. This patent relates to a use of a melting point depressant in a frozen, pre-proofed, uncooked bread dough. The expressed function of the melting point depressant in the frozen dough is to permit the dough to quickly soften in the oven as the temperature rises, permitting better oven spring during cooking. One of the described melting point depressants was ethanol.

Another patent addressing frozen dough problems is European Patent Application 84308045.8, filed Nov. 20, 1984. This Application relates to a method for producing yeast-leavened frozen pastry products which can be removed from the freezer and baked without the necessity of having to undergo further proofing or leavening. To eliminate the need for a lengthy thawing and proofing step prior to baking, the Patent Application described a slow freezing step.

SUMMARY OF THE INVENTION

The present invention includes a method for making a baked bread from a dough subjected to freezing temperatures. The baked bread has a specific volume substantially the same as bread made from a dough not subjected to freezing temperatures. The method includes preparing a dough containing at least flour and water and sufficient leavening gas to provide a specific volume at storage temperatures in excess of between about 1 to 2.5 cc per gram. The product is stored at a temperature that is less than about 45° F. (7° C.). Ethanol, glycerol or other alcohols or polyols are added to the dough in amounts that range from about 1.5% to about 2% by weight of the dough. The dough is stored in a container. The container has a volume at least equal to the volume of the dough product. The container volume, in excess of the dough product, contains about 95% by volume of carbon dioxide gas.

The present invention also includes a system of maximizing specific volume in a bread baked from dough subjected to freezing temperatures. The dough has a matrix of gas cells defined by the dough. The system includes a dough that includes a water component. The dough also includes a quantity of ethanol, glycerol or other alcohol or polyol in a concentration effective to partially swell and/or solubilize proteins within the dough defining the gas cells. These swollen and solubilized proteins are believed to promote expansion of the gas cells. Because the partial pressure of carbon dioxide in the air cells of the dough is typically greater than the partial pressure of carbon dioxide outside the dough, carbon dioxide has a tendency to migrate from within the dough to outside the dough. In addition, since carbon dioxide is also soluble in the aqueous phase of the dough, when the water in the dough freezes, carbon dioxide escapes from the dough since carbon dioxide is not soluble in ice. To counteract these effects, carbon dioxide is provided in the container in a quantity effective to minimize an escape of carbon dioxide from the dough.

The present invention also includes a method for substantially preventing a formation of ice crystals in bread dough when the dough is stored at temperatures as low as 0° F. while maintaining a specific volume and flavor, when baked, that is at least as acceptable as a conventional leavened bread baked from a dough that has not been frozen. The method includes preparing a dough with a hydrophobic plasticizer. Solutes having colligative freezing point depressant effects such as sucrose, ethanol, and and solutes having non-colligative freezing point depressant effects, such as maltodextrin are added to the dough in concentrations up to three times greater than concentrations in doughs not subjected to freezing temperatures. The dough is stored in an atmosphere enriched in carbon dioxide at a temperature as low as about 0° F. (−18° C.).

The present invention also includes a dough product that is resistant to ice crystal formation at a temperature as low as 0° F. (−18° C.). The dough product includes a hydrophobic plasticizer and a sucrose concentration that is up to three times greater than the concentration in conventional dough.

The present invention further includes a kit that includes the dough of the present invention and a container wherein the dough is stored at a temperature as low as 0° F. in the container under an atmosphere that is substantially carbon dioxide.

DESCRIPTION OF DRAWINGS

FIG. 9 illustrates a graphical view of a baked specific volume for the ice-resistant dough of the present invention as compared to the baked specific volume of an unfrozen dough.

DETAILED DESCRIPTION OF PREFERRED EMBODIMENTS

Figure 1:
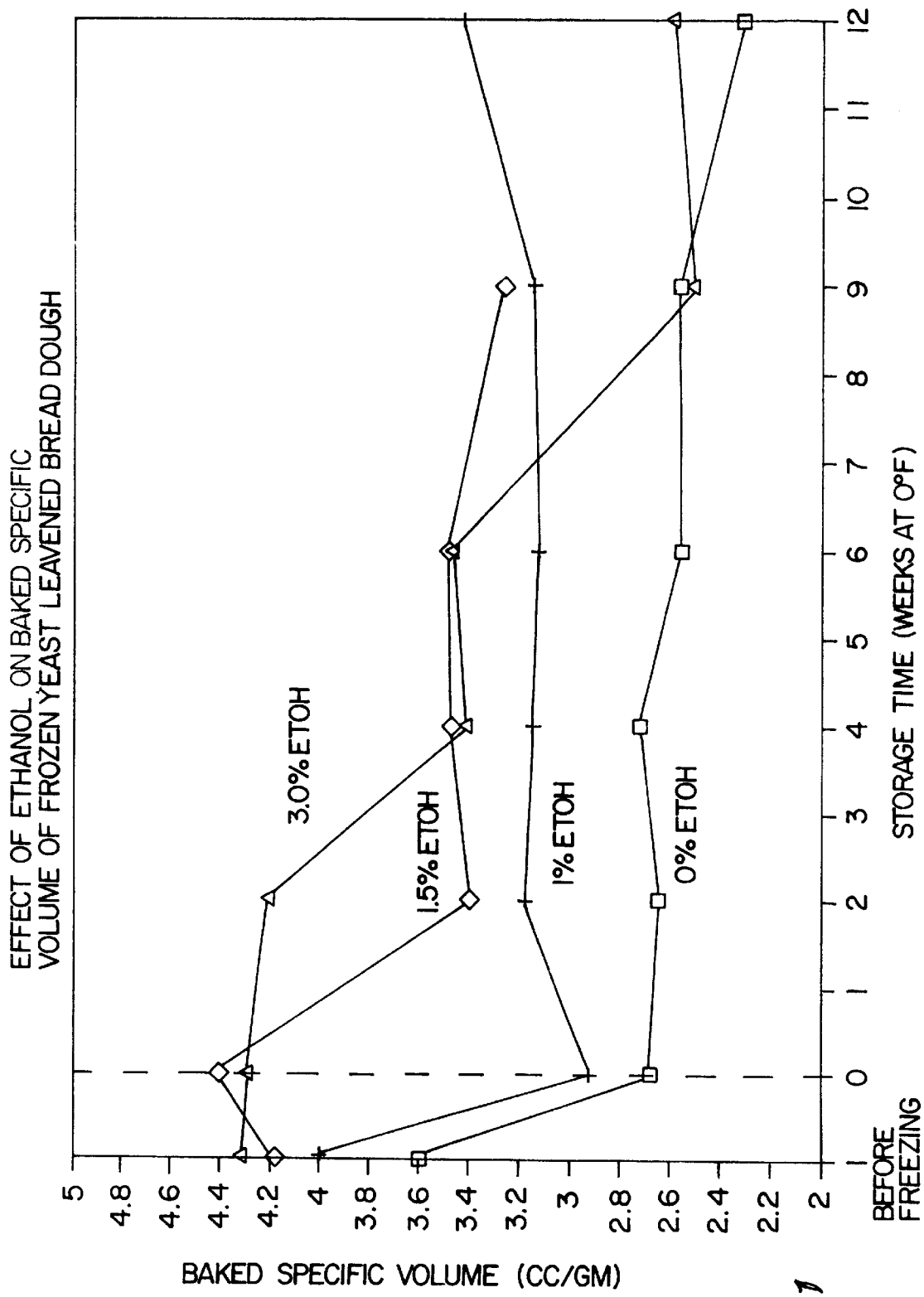
FIG. 1 is a graph showing functional relationships between baked specific volume of bread and storage times of dough having different levels of ethanol.

The present invention includes a method for making dough that can be stored at freezing temperatures, and which, when baked, provides a baked product having organoleptic qualities similar to a product baked from a dough that has not been subjected to freezing temperatures. This desirable outcome is accomplished by sustaining an amount of carbon dioxide that is present in the dough throughout the proofing, freezing and storing of the dough. The method comprises providing a system which stabilizes and protects the gas cells that are formed when the dough is mixed and proofed. By strengthening and protecting these gas cells, the carbon dioxide generated in the dough remains within these cells, providing desired final baked product qualities.

The method of the present invention stabilizes and enhances gas cell structure of the dough by a use of alcohol or other polyol to solubilize proteins within the dough. The solubilized proteins provide strength to the gas cell walls while permitting the gas cells to expand, thereby enhancing carbon dioxide retention within the dough matrix. The enhanced expandability of the gas cells in the dough also enhances the ability of the gas cells to expand during baking, resulting in a product having a desirable specific volume. The method further stabilizes carbon dioxide retention within the dough upon freezing, by packaging the dough in a carbon dioxide environment.

The concentration of carbon dioxide present in the cell matrix of the dough is additionally maintained by substantially reducing a formation of ice within the dough, even when the dough is stored at temperatures below 0° C. Typically, formation of ice upon freezing a dough adversely affects the dough matrix and its carbon dioxide content in several ways. First, ice crystals cause structural damage to the dough matrix by physically rupturing the gas cells present near an ice crystal. Second, carbon dioxide is not soluble in ice, so when water in the dough freezes, the carbon dioxide dissolved in the water escapes from the dough. Another way in which ice formation adversely affects the dough is by dehydrating the dough. Ice crystals can form inside an air cell in the dough through vapor phase deposition as the temperature of the dough decreases during freezing. These ice crystals within the air cells deplete the dough of water. Upon thawing and/or baking, the air cell ice crystals melt, but the water does not reabsorb back into the dough. The result is, in effect, a dough with a lower water content. As described in U.S. Pat. No. 4,374,151, doughs with reduced water contents do not provide as desirable baked specific volumes because the reduced water containing dough is stiffer and less extensible.

The method of the present invention reduces the deleterious effects of ice by substantially reducing ice formation within the dough. Because ice crystal formation is greatly reduced, gas cells are less likely to rupture and lose carbon dioxide trapped in the cell. Furthermore, the carbon dioxide which may be solubilized in the aqueous phase of the dough remains dissolved in the dough and is not released by the dough. This feature is enhanced by the carbon dioxide environment in which the dough is packaged. Additionally, because the formation of ice crystals is reduced, the dough matrix will not be as dehydrated by migration of water into the air cells, so the dough will retain substantially all of its original moisture content even after freezing.

The method of ice resistance of the present invention produces a dough that can be cooled to a temperature as low as about 0° F. (−18° C.) without substantial ice formation in the dough, without reducing specific volume of bread baked from the dough and without impairing flavor and mouthfeel of the bread baked from the dough as compared to bread baked from a dough that has never been frozen. The method of the present invention includes steps of adding solutes to the dough such as sucrose, ethanol, glycerol, and other polyols that act as colligative freezing point depressants, reducing the quantity of water added to the dough as compared to doughs not subjected to freezing, and adding liquid oil to the dough to plasticize the dough. In one embodiment, the method also includes a further addition of solutes that act as non-colligative freezing point depressants, including a high molecular weight biopolymer such as one dextrose equivalent (DE) maltodextrin, hydrocolloid polymers and polyvinylpyrolidones to reduce the freezing point of the dough.

The present invention also includes a dough product substantially free of ice at a temperature as low as 0° F. (−18° C.). The dough product includes a water concentration of not more than about 25% by weight, a concentration that is significantly lower than a conventional bread dough, a hydrophobic plasticizer such as a liquid oil and one or more polyols such as glycerol or ethanol. Polyols in the dough include sucrose in a concentration as much as three times greater than the sucrose concentration of a conventional bread dough.

It has surprisingly been found that ice formation is substantially prevented in dough of the present invention and bread quality is enhanced by the interaction of three aspects of the present invention. The first aspect is the addition of polyols and alcohols such as ethanol and glycerol. Polyols and alcohols exhibit a freezing point depression effect in addition to stabilizing cell integrity and enhancing the ability of the dough matrix surrounding the air cells to expand during baking. The second aspect is a combination of colligative and non-colligative freezing point depressants, such as maltodextrin, that depress freezing in the dough to a temperature as low as 0° F. (−18° C.)., and adding a dough plasticizer, without adversely impacting either the baked specific volume or organoleptic properties of the bread baked from the dough. The third aspect of the method of the present invention is packaging the dough in a carbon dioxide environment.

The freezing point of the dough of the present invention is lowered far below that of conventional bread doughs. A conventional lean bread dough freezes at about 25° F. (−4° C.). A conventional sweet dough freezes at about 16° F. (−9° C.). As used herein, a dough freezes when ice crystals form within the dough. Freezing is also demonstrated by a stiffening of the dough, that is, a loss of deformability of the dough.

The initial freezing point of a dough is defined herein as the highest temperature at which ice can exist in equilibrium with water in the dough. As a result of the method of the present invention, the initial freezing point of the dough of the present invention is depressed by both an addition of solutes to the dough and a reduction of water concentration in the dough. The solutes include simple carbohydrates, such as glucose and sucrose, salt, and polyols and alcohols such as glycerol and ethanol, as well as macromolecules such as maltodextrins.

The desirable baked bread obtained from utilizing the method of the present invention and the dough product of the present invention to make a baked bread product are surprising because a view of those skilled in the art is that reducing water content in dough creates a dough product that is so stiff and non-extensible that proper oven spring and rise do not occur when the dough is baked. This view was expressed in the Lindstrom, et al. patent, U.S. Pat. No. 4,374,151, issuing Feb. 15, 1993.

It has further been surprisingly found that the ice-resistant dough produced by the method of the present invention has a flavor and mouthfeel at least comparable to or better than the flavor and mouthfeel of conventional breads and bread doughs. These results are unexpected because ingredients such as sucrose and ethanol are added in quantities that would be expected to adversely impact flavor. Water content of the dough is reduced by an amount that would be expected to adversely impact mouthfeel and the baked specific volume of the product.

One embodiment of the present invention deals with one of the significant problems encountered with the use of frozen, pre-proofed, uncooked doughs which is a reduction of specific volume when the product is baked. Typically, when the dough is baked, its volume is significantly reduced, particularly if the product has been through one or more freeze-thaw cycles, as compared to a product baked from a freshly made dough. The method of the present invention solves this problem by use of ethanol, glycerol or other alcohol or polyol and a controlled carbon dioxide environment surrounding the dough during storage.

The method of the present invention is usable to make a wide range of dough products, including breads and pastries, and can be used with laminated and non-laminated doughs. It has been found that by using a prescribed carbon dioxide gaseous environment, the quality of improvement with storage time can be achieved and the use of ethanol, glycerol or other alcohol or polyol in the dough improves product performance after storage time. Further, with the use of both the prescribed carbon dioxide environment and ethanol, a synergistic effect in product performance is achieved. In particular, bread dough subjected to storage with carbon dioxide and treatment with an alcohol such as ethanol or a polyol such as glycerol, has a specific volume that is synergistically greater than the sum of specific volumes of bread doughs subjected to either the carbon dioxide treatment or a specific volume of bread dough subjected to the ethanol treatment.

Figure 8:
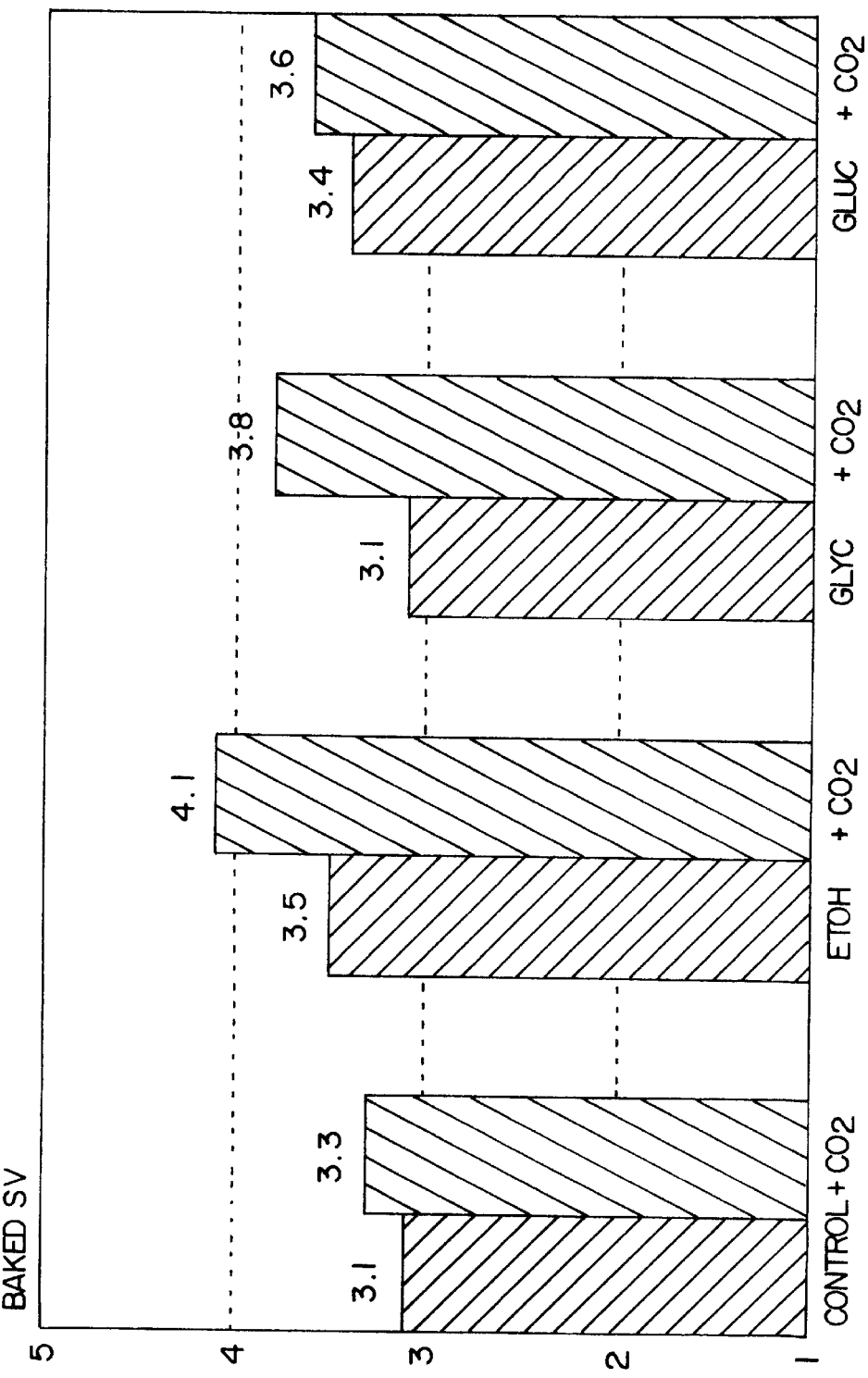
FIG. 8 is a graphical illustration of a synergistic effect of a combination of ethanol or glycerol added to bread dough and carbon dioxide on specific volume of baked bread made from the dough.

This synergistic effect is quantified and shown graphically in FIG. 8. The dough tested to obtain data shown in FIG. 8 included added ethanol in one test sample and glycerol in another test sample and was packaged in a carbon dioxide environment. The dough was stored in the carbon dioxide environment for at least twelve weeks. The specific volume (sv) was measured as cc/gram of bread.

The first two bars of the bar graph in FIG. 8 show an increase in specific volume of 0.2 when the bread dough was stored in carbon dioxide. The value, 0.2, is the difference between the specific volume of dough stored in carbon dioxide and the specific volume of dough stored without the carbon dioxide, the control. The doughs represented in the first two bars do not include "exogenous" or added ethanol.

The seventh and eighth bars include added glucose in the seventh bar and added carbon dioxide in the eighth bar. The difference in specific volume between doughs represented in bars seven and eight is 0.2. This difference is the same as the control bar. Thus, the addition of added glucose does not have an additive effect on increasing specific volume.

The third bar shows the specific volume of a dough containing ethanol but not stored in a carbon dioxide environment. The fourth bar shows the specific volume of a dough containing ethanol and stored in carbon dioxide. The difference in specific volumes is 0.60 cc/gram which is 4.1–3.5. Based upon the performance of dough stored with carbon dioxide, the second bar, the expected difference between bars three and four, is 0.20. Thus, the additional 0.40 cc/gram are an unexpected 66% synergistic increase in specific volume of bread dough made with added ethanol and stored in a carbon dioxide environment.

The fifth bar in FIG. 8 shows the specific volume of a bread dough to which glycerol has been added. The sixth bar shows the specific volume of a bread dough made with added glycerol and stored with carbon dioxide. The difference in specific volumes is 0.7 (3.8–3.1). The additional 0.5 cc/gram (0.7–0.20) is an unexpected, synergistic increase in specific volume of bread dough made with added glycerol and stored in a carbon dioxide environment.

A dough for use in the method of the present invention can be formed in any suitable manner such as described above by the sponge method, the straight dough method, or the continuous dough method, as is known in the art. The particular formula for the dough will be dictated by the resulting end product. It can range anywhere from a bread to pastry. Breads have fat within a concentration range of 0% to about 6% and pastries generally have a fat content within a range of about 6% to about 30% by weight of the dough.

Generally, flour is present in an amount in a range of about 50% and about 60% by weight of dough, water in an amount between about 30% and about 40% by weight of dough, sugar in an amount and a range of between 2% and about 8%. Other dry minor ingredients, such as dough conditioners and salt may be present. Depending upon the type of leavening desired, either a chemical leavenor that produces carbon dioxide by a reaction between, for example, sodium bicarbonate and glucono-delta-lactone or yeast can be added to the dough to provide the desired production of carbon dioxide to leaven the dough. Typically, chemical leavening agents are added in an amount in a range of between about 2% and about 5% and yeast is added in an amount in a range of between about 0% and about 6% by weight of the dough.

The foregoing percentages are by weight of the dough as mixed. Ethanol is also produced in yeast leavened doughs during proofing and generally is present in an amount within a range of between about 0.5% and about 2% by weight of the dough as proofed when yeast is used as the leavening agent. The other ingredients generally remain about the same in their relative proportions as described above.

In one embodiment, edible ethanol is added to yeast leavened doughs in a range between about 0.5% and about 3% so that the total ethanol concentration is in a range of between about 1% and about 5% of bread weight.

During cooking, the dough loses some of the volatile components, such as ethanol, and other liquid components, including water, that evaporate at the cooking temperature. Typically, water loss is in a range between about 10% to about 12% of the total water during cooking. If the product is fried, water is lost, and there is some fat pickup. The final fat content depends upon the amount of initial fat added to the product. During cooking, the ethanol is substantially lost through vaporization. The cooking temperature is in a range of about 350° F. (163° C.) and about 400° F. (205° C.) for baking and is in a range of between about 350° F. (175° C.) and about 400° F. (205° C.) for frying.

As described above, the dough is prepared preferably by either the sponge method or the straight- dough method. The dough is mixed in a suitable mixer. The dough may optionally be sheeted or laminated. After sheeting and laminating, the product is cut and/or formed into a desired shape as is known. These formed pieces are then proofed preferably at a relative humidity in a range of between about 60% and about 90% at a temperature in a range of between about 75° F. (24° C.) and about 105° F. (41° C.) or preferably in a range of between about 80° F. (27° C.) and about 95° F. (35° C.). Proofing is conducted until the proper degree of proofing is obtained, which can be measured by the volumetric rise of the dough. Generally this volumetric rise is in a range of about 125% and about 300% of the original volume of the dough piece or, preferably, in a range of between about 175% and about 275% and most preferably in a range of between about 200% and about 250%.

The proofed pieces of dough are then cooled in their appropriate storage temperature, and are then packaged in suitable packaging. Preferably, the storage temperature is below about 45° F. (7° C.). The temperature is in a range of between about 33° F. (1° C.) and about 45° F. (7° C.) for refrigerated distribution of the product. For frozen distribution, i.e., a temperature of less than 32° F. (0° C.), the preferred storage temperature is in the range of about −60° F. (−51° C.) and about 20° F. (−7° C.), preferably in a range of between about −40° F. (−40° C.) and about 10° F. (−12° C.) and most preferably is in a range of between about −10° F. (−23° C.) and about 0° F. (−18° C.). Storage temperature will vary throughout storage time. It is preferred that these temperatures will be maintained for at least about 90% of the time the product is stored.

The dough should have a specific volume of about 1.0 to 2.5 cc/gram just prior to storage.

The dough product can be cooled before or after it is placed in suitable packaging. Preferred packaging includes hermetically sealed packages with the packages being made of materials having suitable barrier properties to retain a gaseous carbon dioxide environment therein over the expected shelf life of the product. It is preferred that the package volume be in excess of a dough product volume contained therein. If there is any excess volume, commonly referred to as head space, it should contain at least about 50% by volume of carbon dioxide. Preferably, the head space contains about 100% carbon dioxide. The carbon dioxide gas can be added by gas flushing of the package as is known.

It has been found that by use of ethanol, glycerol or other alcohol or polyol in the product that an improvement in baked specific volume can be achieved over extended frozen storage. It was also found that the use of prescribed carbon dioxide environments surrounding the dough during storage would also result in an increased baked specific volume after storage time. Surprisingly, as discussed, it was found that the combination of the two provided a synergistic effect by producing exceptional specific volume of baked bread with extended storage times for the dough.

It is believed that the added ethanol, glycerol and other alcohols or polyols partially swell and/or solubilize proteins in the dough. These swollen and solubilized proteins act to modify the viscoelastic behavior of the dough lamella between gas cells and, by absorption to and enfolding at the gas cell/dough interface, reduce the surface tension at the gas cell wall. To understand the effect of modifying the viscoelastic behavior of the dough, dough can be characterized as a matrix of gas cells. Each gas cell is conformed within the dough. "Gas" in the gas cell as most leavening reactions proceed is mainly carbon dioxide. The size of any given gas cell depends upon the degree and rate of carbon dioxide production that occurs within the dough as well as upon the viscoelastic properties of the doughs defining each individual gas cell. If the viscoelastic properties of the dough are modified such that the gas cells can more easily expand, a dough having larger gas cells, hence a greater specific volume, will result.

Surface tension at the gas cell wall is believed to be an important contributor to baking performance. Carbon dioxide generated by the leavening agents in the dough creates pressure in the gas cell against the gas cell walls. It is believed that proteins present in dough undergo a degree of unfolding and denaturation at the gas cell/dough interface, resulting in lower surface tension. When the surface tension is lower, less pressure is required to expand gas cells in the dough and higher baked specific volumes result. It is believed that one function of ethanol, glycerol or other alcohols or polyols in dough is to partially swell and/or dissolve dough proteins to a greater degree than that which occurs in the absence of added alcohols or polyols. These swelled and/or dissolved proteins become more available for absorption to and partial denaturation at the dough/gas cell interface, further lowering the surface tension and decreasing the pressure required to expand gas cells throughout the dough. It is believed that this relationship permits the gas cells to expand dramatically in the presence of ethanol, glycerol or other alcohols or polyols added to the dough.

If the proofed dough is placed in an air environment, carbon dioxide present in the dough gas cells as a result of proofing will have a higher partial pressure than carbon dioxide in the surrounding environment. This creates a tendency for the carbon dioxide to leave the dough, which ultimately adversely affects the baked product characteristics. Once the dough has been proofed and as the dough cools, carbon dioxide solubility in the aqueous phase of dough also increases. Carbon dioxide has a tendency then to dissolve in the dough until the freezable water in the dough changes to ice. Once this physical change occurs, all of the carbon dioxide that was dissolved in the water will be abruptly released. In a conventional packaged dough, this carbon dioxide will escape from the dough. By packaging the dough in an environment flushed with carbon dioxide, an equilibrium is created such that the tendency for carbon dioxide to escape from the dough is reduced.

Figure 4:
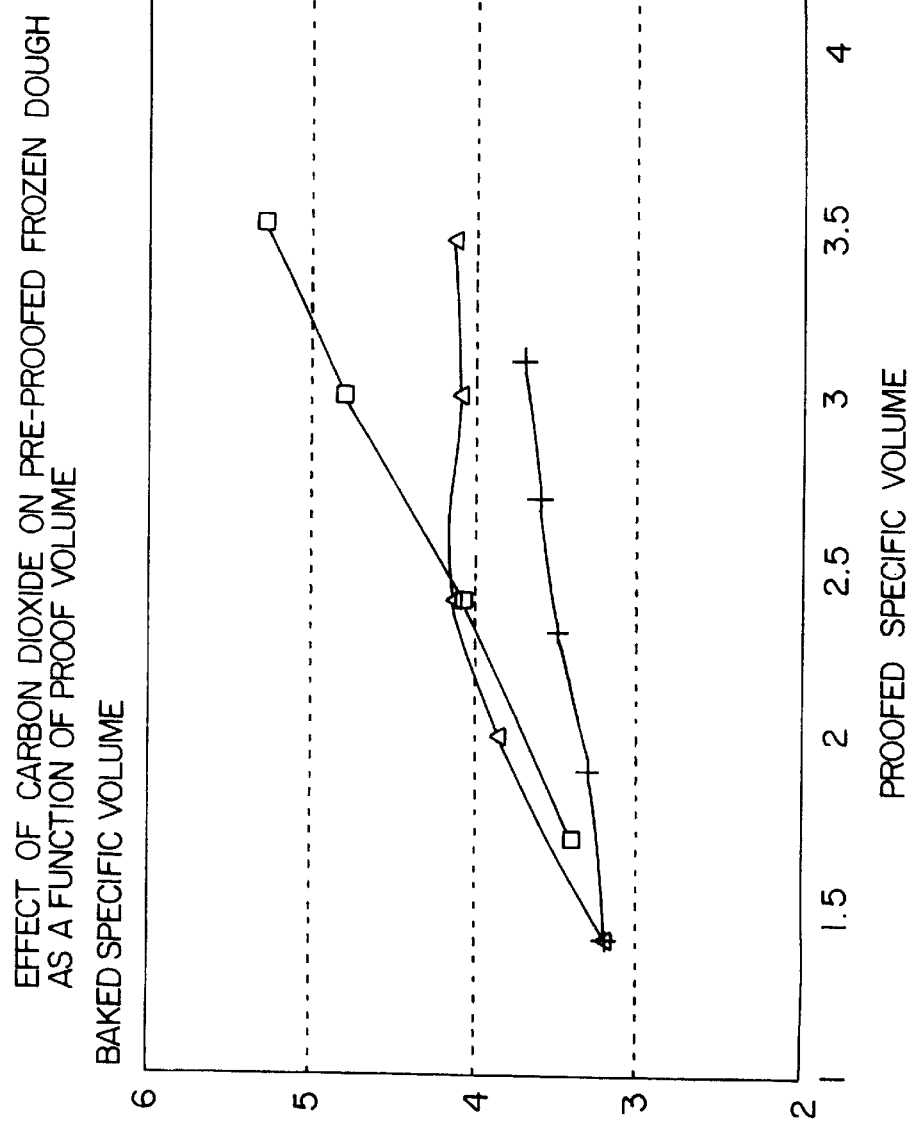
FIG. 4 is a graph showing functional relationships between baked specific volume and proofed specific volume for doughs containing 1.5 weight % ethanol and frozen in environments containing air or carbon dioxide.

The effect on specific volume of ethanol addition to a dough as a function of proofed, unbaked specific volume is shown graphically in FIG. 4. Proofed specific volume is a specific volume of the raw dough. In commercial dough manufacture, it is desirable to produce doughs with lower proof specific volumes as lower specific volumes are more tolerant to physical disturbance, such as during shipping—in other words, low proof specific volume doughs are less fragile. Also shown in FIG. 4 are baked specific volumes for products baked from fresh dough containing 1.5 weight % ethanol, frozen dough containing 1.5 weight % ethanol, and packed in an air environment, and frozen dough containing 1.5 weight % ethanol packed in a carbon dioxide environment. Desirably, the slope of the frozen dough containing added ethanol and stored in a carbon dioxide atmosphere that more closely approximates the fresh dough specific volume slope relationship, surprisingly, even when the frozen dough started with a proofed specific volume lower than the proofed specific volume of the fresh dough. This means that it is possible to start with lower proofed specific volumes, as is desired particularly for commercial dough manufacture, and still obtain baked specific volumes similar to those of freshly made baked dough products.

Improved performance is demonstrated by the following examples which illustrate, but do not limit, this invention.

EXAMPLE ONE: YEAST LEAVENED BREAD

This example shows the ability of carbon dioxide or combinations of carbon dioxide and ethanol to extend the shelf life quality of yeast leavened, low fat proofed, frozen dough structures. Fifty pound batches of bread doughs were prepared using the ingredients and formulations shown in Table 1. The process is described below:

TABLE 1

| | PERCENT BY WEIGHT | | | |
|---|---|---|---|---|
| INGREDIENT | A | B | C | D |
| Flour, hard, high gluten untreated | 58.780 | 58.710 | 58.750 | 58.750 |
| Water, 32° F.–40° F. (0° C.–4° C.) | 21.350 | 20.420 | 19.880 | 18.380 |
| Ice, crushed | 7.690 | 7.690 | 7.690 | 7.690 |
| Dextrose | 2.000 | 2.000 | 2.000 | 2.000 |
| Salt | 1.200 | 1.200 | 1.200 | 1.200 |
| Potassium bromate | 0.080 | 0.080 | 0.080 | 0.080 |
| Flour enrichment | 0.008 | 0.008 | 0.008 | 0.008 |
| Ascrobic acid | 0.002 | 0.002 | 0.002 | 0.002 |
| Ethanol | 0.000 | 1.000 | 1.500 | 3.000 |
| Water, 105° F.–110° F. (40° C.–43° C.) | 7.690 | 7.690 | 7.690 | 7.690 |
| Yeast, active dry | 1.200 | 1.200 | 1.200 | 1.200 |
| | 100.000 | 100.000 | 100.000 | 100.000 |

A hydrated yeast slurry was prepared by combining the active dry yeast and 105° F.–110° F. (40° C.–43° C.) water, and stirring the combination for 10–15 minutes using any suitable low shear mixer. This hydrated yeast slurry was used within 15 minutes of its preparation.

The hydrated yeast slurry and all remaining ingredients were placed in a bowl of a dough mixer such as the J. H. Day mixer Model 30842. The ingredients were mixed at "low" speed for about thirty seconds, and then at "medium" speed for about four minutes to form a typical bread dough.

A dough structure was formed using methods well known in the baking industry. About 15 pounds of dough were placed on a belt of a Seewer Rondo Model 550063 sheeter. A surface of each dough sample was lightly dusted with flour, and passed through the rolls of the sheeter to form a uniform dough sheet, or pad, approximately 7 mm thick. The pad was folded upon itself two times, and again reduced to a 7 mm thickness. The resulting dough pad was again folded upon itself two times, and reduced to 7 mm thickness. The final dough pad consisted of about 16 layers of dough. The dough pad was cut into rectangularly shaped pieces each about 4 inches by 7 inches and weighing 200 grams. The surface of each dough piece was lightly sprayed with water and, starting with the narrow end, rolled into a cylinder form. The dough cylinders were placed in standard 2.75 inch ×5.5 inch loaf shaped Ekco brand aluminum foil baking pans, and proofed at 95° F. (35° C.) and 75% relative humidity. All doughs were proofed to a given specific volume of about 2.5 cc/gm. The actual proofing time depended on the ethanol content of the dough and ranged from about two hours for 0% ethanol to about six hours for 3% ethanol.

Following proofing, the dough was stored for about 1–1½ hours in a mechanical freezer maintained at an ambient temperature of about −10° F. (−23° C.). Freezing the dough in this manner arrested further yeast metabolism and also prevented deformation of the fragile dough structures.

The frozen dough structures were packaged in a gaseous atmosphere of the following composition:

A. 99% Carbon Dioxide and 1% Air

B. 75% Carbon Dioxide and 25% Air

C. 50% Carbon Dioxide and 50% Air

D. 0% Carbon Dioxide and 100% Air (Control)

Each dough structure was placed into a 10 inch×12 inch pouch constructed of a material which was essentially impervious to gases. An example of a suitable pouch material is a laminated film constructed of 1 mil Nylon, a Saran emulsion polymer, and 2 mil Surlyn®. The pouches containing the frozen dough structure were sealed except for an opening along one edge. A specific storage gas or gas mixture was injected into a pouch by inserting a nozzle through this opening. Each gas or gas mixture was injected into and then expelled from the pouch three times, and then injected a fourth and final time before sealing the opening. This procedure helped assure that the experiment gas or gas mixture had displaced the atmospheric gases originally in the pouch. Residual oxygen in each pouch was measured after packaging and prior to each product evaluation using a Mo-Con LC-700F oxygen analyzer manufactured by Modem Controls, Inc., Elk River, Minn., in order to monitor the integrity of each pouch.

The gas packaged dough structures were stored in a freezer maintained at an ambient temperature of about 0° F. (−18° C.).

Samples of each experimental variable were evaluated immediately before freezing, after freezing, and thereafter, at two or three week intervals as follows: The bread doughs in their foil loaf pans were removed from their pouches, placed on a metal baking tray, and baked in a convection oven manufactured by Despatch Model SS-7 at 375° F. (191° C.) for 33–37 minutes. The specific volume and sensory quality of each bread was measured.

Figure 2:
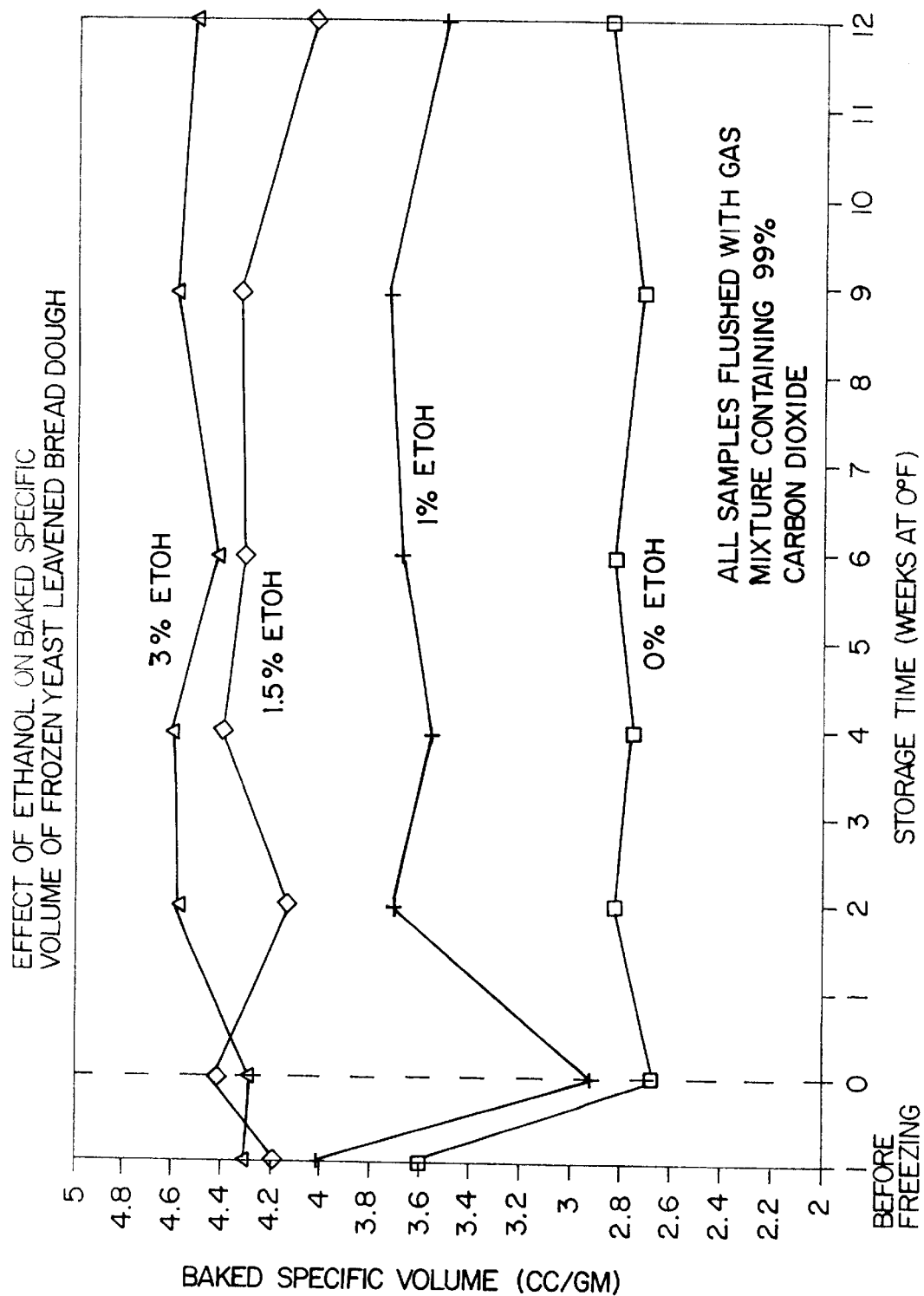
FIG. 2 is a graph showing functional relationships between baked specific volume of bread and storage times of dough having different levels of ethanol and with a package being flushed with a gas containing 99% carbon dioxide.
Figure 3:
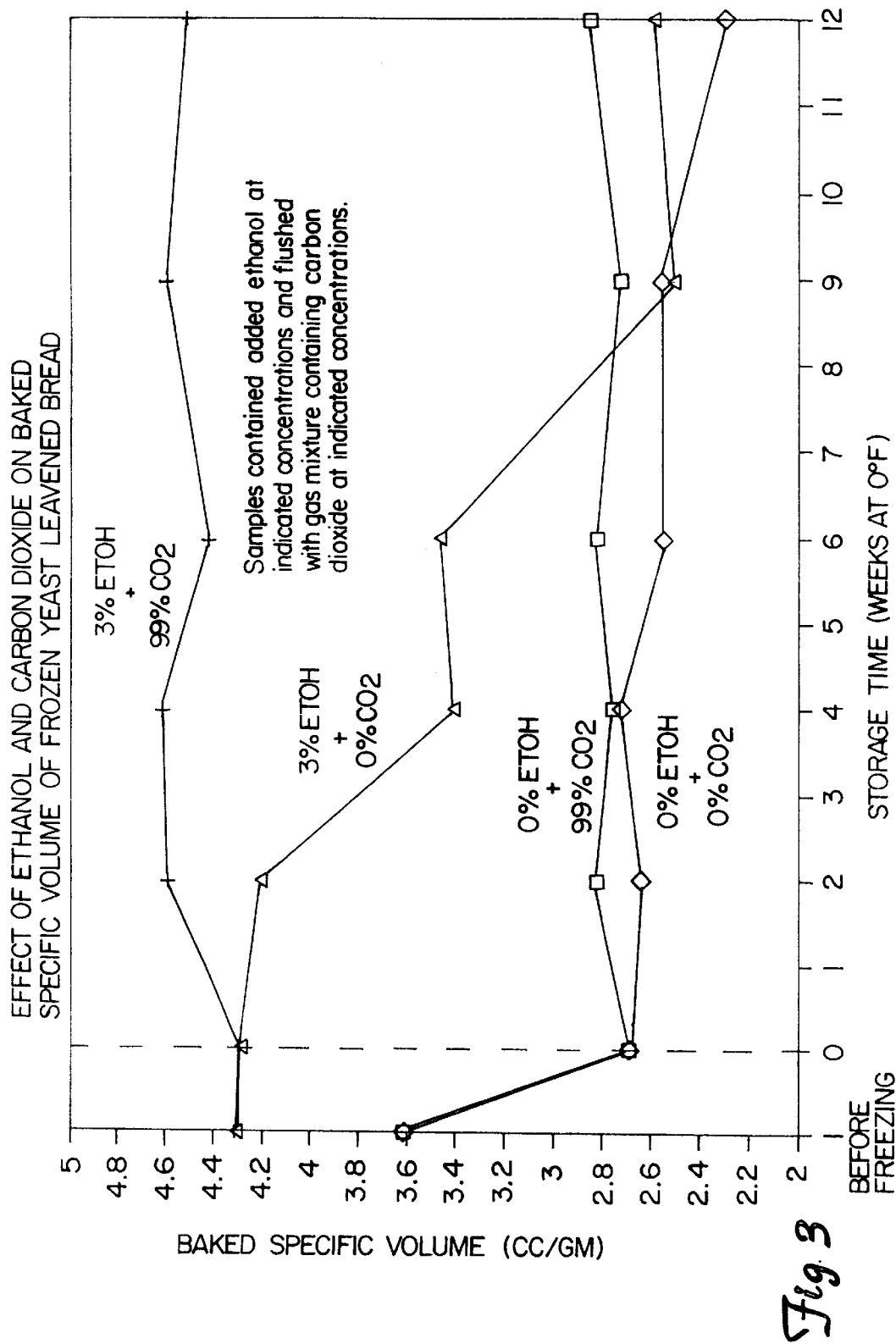
FIG. 3 is a graph showing functional relationships between baked specific volume of bread and storage times of dough having different levels of ethanol and carbon dioxide.
Figure 5:
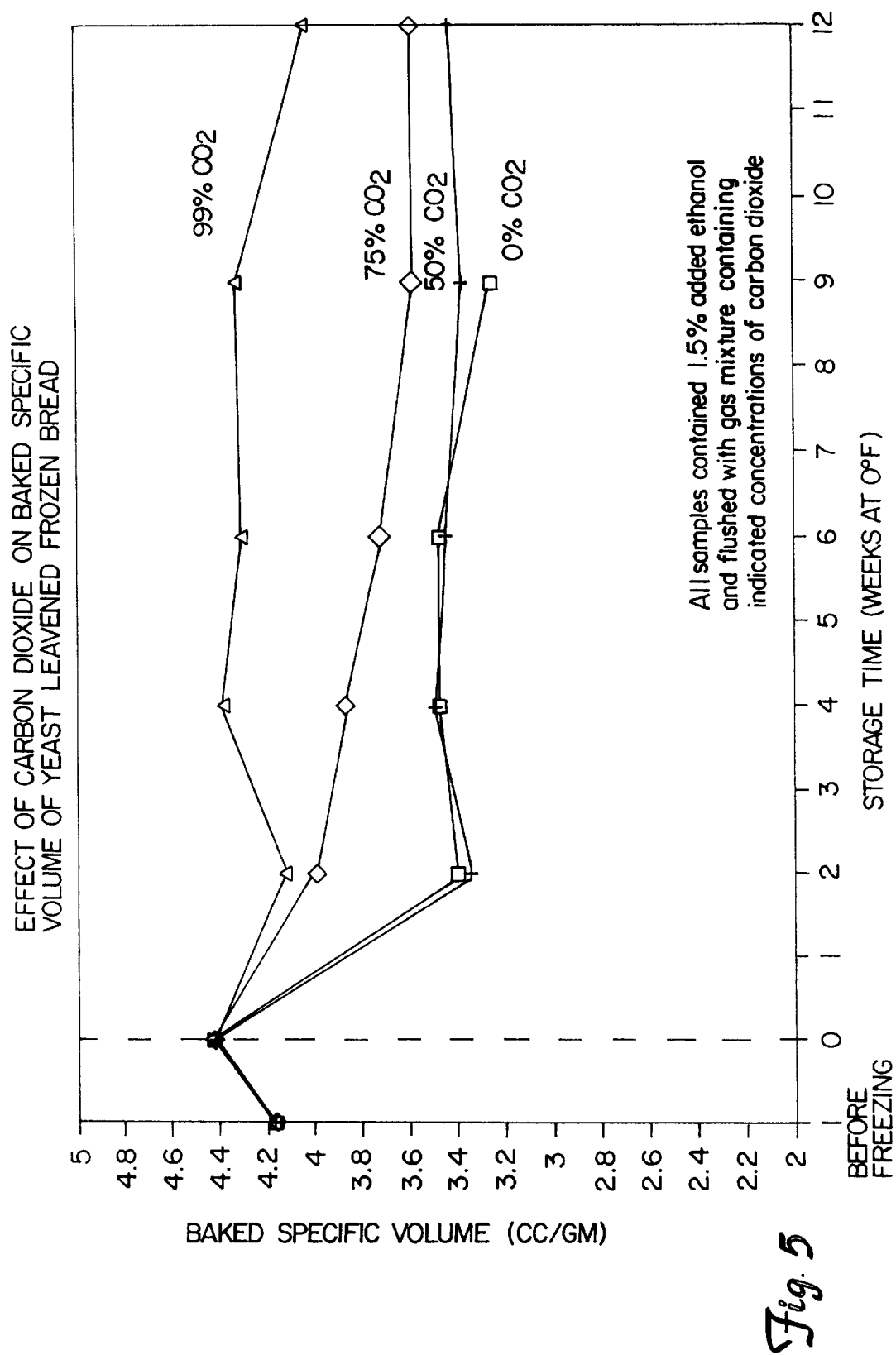
FIG. 5 is a graph showing functional relationships among baked specific volumes for products stored in containers having different carbon dioxide levels with the products each having 1.5% added ethanol.

As shown in FIG. 1, added ethanol above about 1.5% prevented a loss of bread baked specific volume following freezing; however, the products lost specific volume continuously throughout storage time. In addition to the marked drop in specific volume, the products developed an unacceptable gummy consistency. In contrast, as shown in FIG. 2, product containing 1.5% to 3.0% ethanol and packed in a gas mixture containing 99% carbon dioxide retained a high specific volume throughout shelf life. These products were of excellent quality. FIG. 3 illustrates an unexpected synergistic effect between ethanol and carbon dioxide treatments. Samples which contained added ethanol were packed in a carbon dioxide flushed container maintained outstanding quality throughout 12 weeks storage. This quality was greater than that predicted from the storage data of products made with only added ethanol or carbon dioxide. FIG. 5 shows the effect of the flushing gas carbon dioxide concentration on bread specific volume. The desired extension of shelf life quality was achieved with gas mixtures containing more than 50% carbon dioxide.

EXAMPLE TWO: YEAST LEAVENED CROISSANT

The following example demonstrated the application of this invention to a high fat, laminated, and yeast leavened dough structure such as a croissant. A fifty pound batch of dough was prepared using the ingredients and formula shown in Table 2 and the process described below.

TABLE 2

Yeast Leavened Croissant Dough Pad Formula

| INGREDIENT | PERCENT BY WEIGHT |
|---|---|
| Flour, hard, high gluten, untreated | 53.870 |
| Water, 32° F.–40° F. (0° C.–4° C.) | 10.980 |
| Ice, crushed | 7.690 |
| Sucrose | 4.000 |
| Butter, unsalted, 40° F. (4° C.) | 3.000 |
| Dextrose | 2.000 |
| Egg, whole dry | 1.600 |
| Milk, nonfat dry | 1.600 |
| Ethanol | 1.500 |
| Sale | 1.000 |
| Yeast food | .0280 |
| Potassium bromate | 0.080 |
| Flour enrichment | 0.008 |
| Ascrobic acid | 0.002 |
| Water, 105° F.–110° F. (40° C.–43° C.) | 10.690 |
| Yeast, active dry | 1.700 |
| | 100.000 |

Butter pads were prepared by passing butter stored at 45° F.–54° F. (7° C.–12°) through the colander attachment of a Model 300-D Hobart mixer. Approximately 1000 gm quantities of this plasticized butter were molded into 1 cm×30 cm×30 pads using a Rondo Model SS063 sheeter. The butter pads were maintained at 45° F.–54° F. (7° C.–12° C.) until use.

A hydrated yeast slurry was prepared as described in Example Three.

Dough pads were prepared as follows: The remaining dry ingredients and butter were mixed for about one minute in a H. H. Day Model 30842 mixer. The hydrated slurry, water, crushed ice, and ethanol were added to the mixer containing the previously blended dry ingredients. The contents of the mixer were blended at "low" speed for 30 seconds, and then at "medium" speed for 4.5 minutes. The resulting dough was divided into 3000 gm pieces. Each piece was reduced to a pad approximately 0.8 cm×35 cm×60 using a Rondo Model SS063 sheeter, and placed in a 0° F. (−18° C.) refrigerator for about 20 minutes or until the dough pad temperature was reduced to 45° F.–54° F. (7° C.–12° C.).

Laminated dough sheets were prepared from the above butter pads and dough pads. The butter pad was centered on top of the dough pad. The ends of the dough pad were folded over the top of the butter pad such that the ends met at the center of the butter pad. Next, the dough enrobed butter structure was sheeted to a thickness of 10 mm. The structure was folded upon itself twice, and again sheeted to 12 mm thickness. The previous step was repeated three times. Finally, the structure was folded upon itself once, and sheeted to a thickness of 2.75 mm. The resulting laminated dough sheet contained about 64 distinct butter layers.

Individual croissant dough pieces were immediately fabricated from the laminated dough structure. Triangle-shaped sections, each weighing 80 grams, were cut from the laminated dough sheet. Starting at the base of the triangle, each dough triangle was rolled into the shape of a typical croissant. The croissants were proofed at 90° F. (32° C.) and 75% relative humidity until each dough piece attained a maximum height of two inches. The proofed croissants were placed into a −40° F. (−40° C.) freezer for about 1–1½ hours or until firm before final packaging.

The frozen croissants were packaged in atmospheres of 99%–100% carbon dioxide, nitrogen, nitrous oxide, and helium using the packaging material and procedure described in Example One, and stored at 0° F. (−18° C.).

The croissants were evaluated before freezing, after freezing, and, thereafter, at 2–3 week intervals. The croissants were removed from their pouches, placed on a metal baking tray, and baked in a convection oven manufactured by Despatch Model SS-7 at 375° F. (188° C.) for 25–30 minutes. The specific volume and sensory qualities of each croissant were measured.

Figure 6:
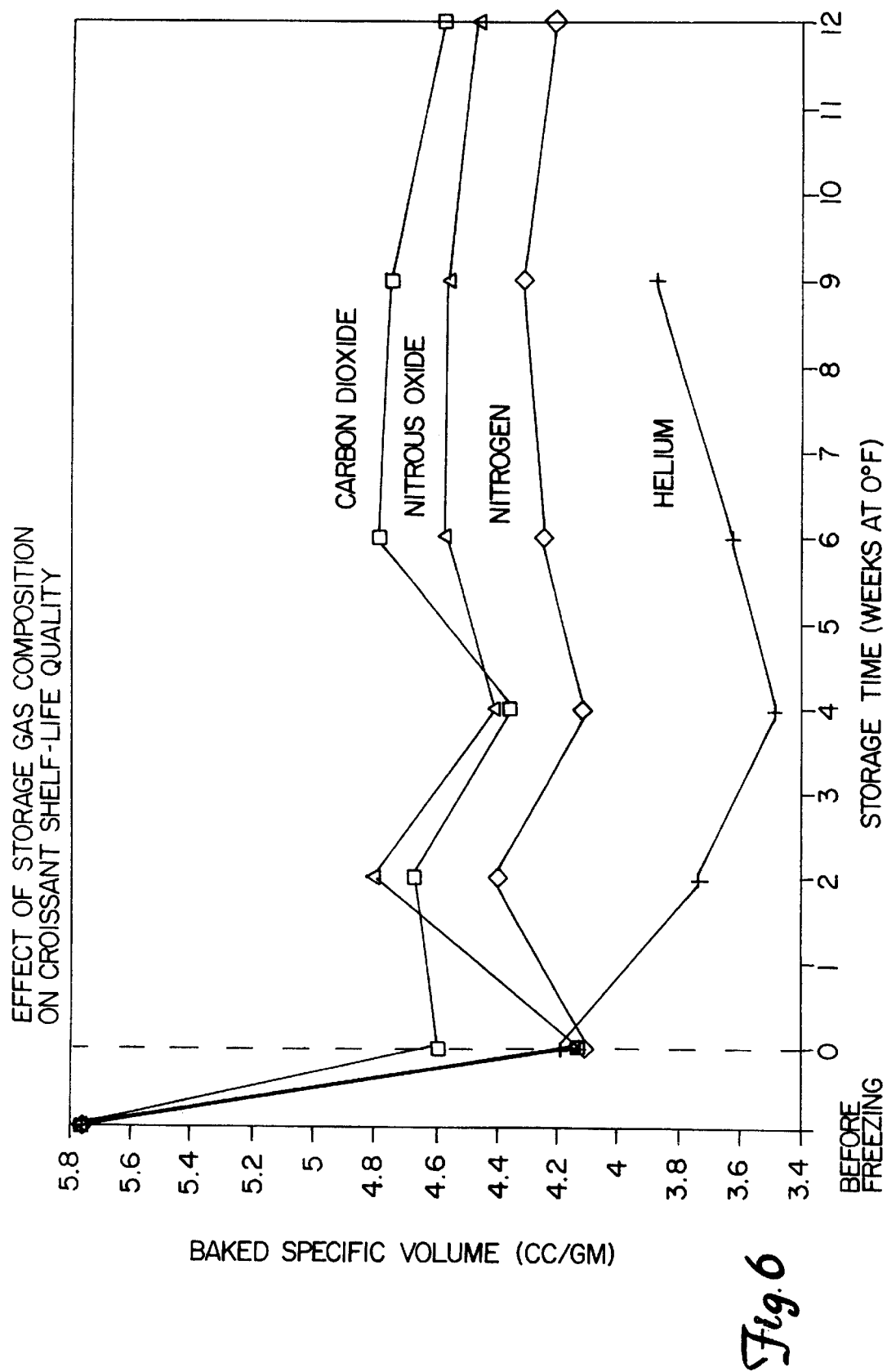
FIG. 6 is a graph showing functional relationships between baked specific volume and storage time with the gaseous environment containing different gases.
Figure 7:
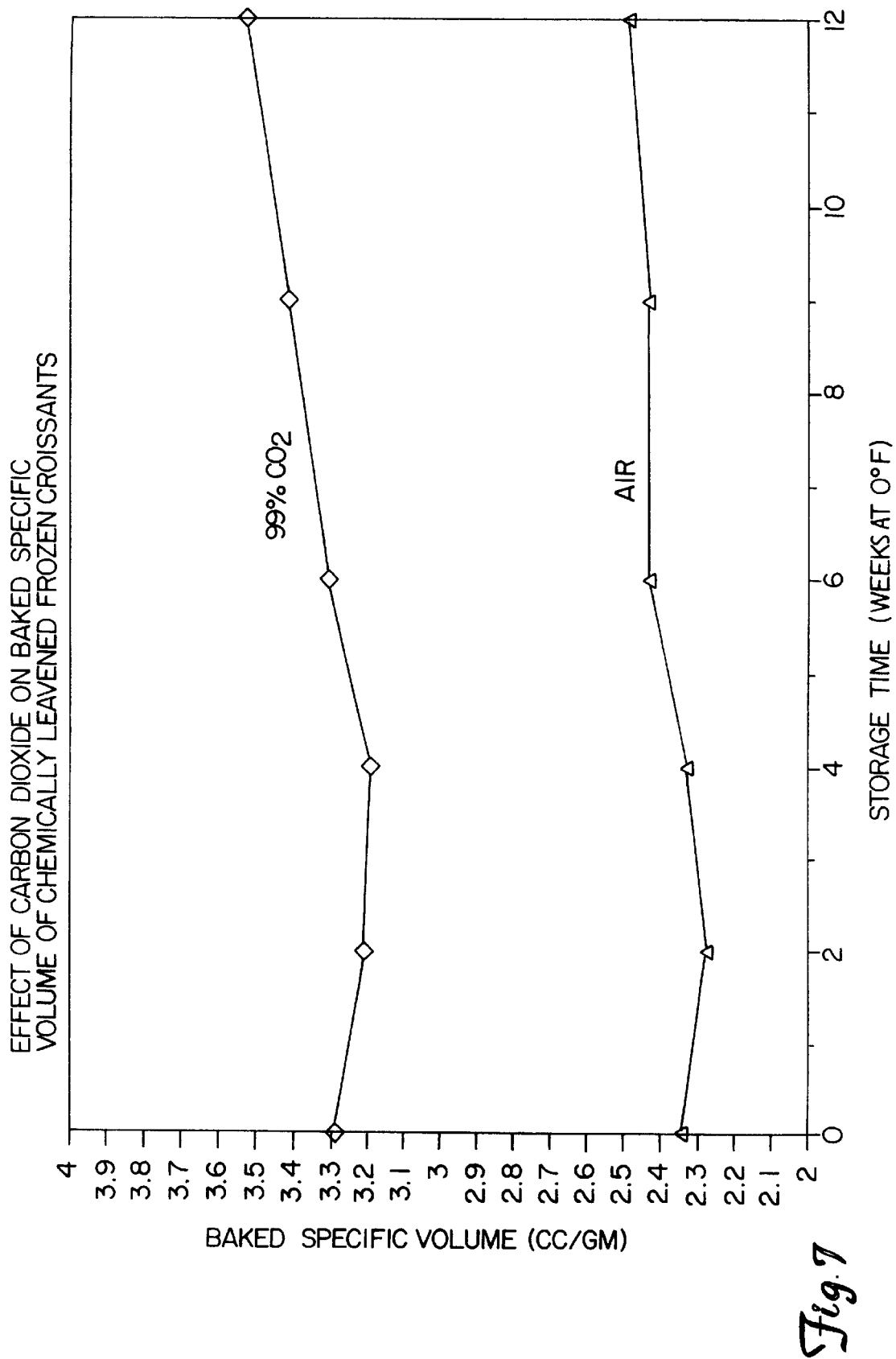
FIG. 7 is a graph showing functional relationships between baked specific volume and storage times for chemically leavened croissants with the gaseous environment being carbon dioxide or air.

The effects of gas composition on the baked specific volume of the croissants throughout storage are shown in FIG. 6. The croissants packed in atmospheres of either carbon dioxide or nitrous oxide gases maintained their specific volume and eating quality. These unexpected observations may be due to the high solubility of carbon dioxide and nitrous oxide in water relative to the other gases as described in the International Critical Tables, McGraw Hill, Vol. 3, pp. 255–260, 1928.

EXAMPLE THREE: YEAST LEAVENED BREAD

This example demonstrated the effects of ethanol and glycerol in doughs packaged in a carbon dioxide environment during twelve weeks of shelf life frozen at 10° F. The doughs were prepared in accordance with the following formula:

TABLE 3

| Flour | 50.0% |
|---|---|
| hard wheat, high gluten enriched | |
| Water | 33.6% |
| Alcohol/Polyol | 2.0% |
| Ethanol or | |
| Glycerol | |
| Salt | 1.1% |
| Dough Conditions | 0.4% |
| Shortening | 2.0% |
| Yeast, compressed | 2.0% |

The ingredients were mixed for ten minutes or until a suitable dough was produced. The dough was divided into samples. Some of these samples were sealed in a package and frozen overnight at −10° F. (−23° C.). The remaining samples were placed for a few hours in a freezer at −10° F. (−23° C.) after which they were placed in a package which was then flushed with carbon dioxide gas. All of the samples were stored at 10° F. after freezing. Samples of the dough were removed at 3 week intervals and baked at 375° F. (191° C.) (approximately 130–160 grams dough per small loaf pan) for approximately 40–45 minutes. The specific volume of the resulting bread products was measured as described in Example Six. The results are shown in FIG. 8 as bars 3–6. Bars 1–2 of FIG. 8 are for the control prepared without either ethanol or carbon dioxide. Bars 7–8 are within 4% glucose to determine whether melting point depression accounts for the specific volumes contained.

EXAMPLE FOUR: MEASURING SPECIFIC VOLUME OF BREAD

The material required for this analysis included a balance capable of weighing up to 500 gm to the nearest gm; a one-pound bread volumeter, manufactured by National Manufacturing Corp. of Lincoln, Nebr.; an aluminum scoop, cast size #2; rapeseeds and sieves from Seedburo Equipment Co. of Chicago, Ill. The sieves included a flax sieve, #13 with round perforations, and the Weevil sieve #35 with round perforations. Equipment also included volume standards of 1675 cc, 1000 cc and 400 cc.

The rapeseeds should contain seeds of many different sizes. The size distribution causes variations in the way the seeds pack in the volume meter and around a bread product. To reduce and largely eliminate measuring errors from seeds, the seeds should be sifted through a Seedburo #35 Weevil sieve to remove large seeds and through a Seedburo #13 Flax sieve to remove small seeds.

The bread volumeter is standardized prior to bread testing. The bread volumeter includes a gate and a volume scale. The bread volumeter also includes a meter, an upper chamber and a lower chamber. The upper chamber and lower chamber are separated by a movable gate.

To standardize the bread volumeter, a gate at the bottom of the bottom scale is closed. With the meter in an upright position, the upper chamber is opened and rapeseeds are added until the chamber is about ¾ths full. The upper chamber is then closed and clamped. The lower chamber is opened by unfastening a clamp and inverting the meter. A standard of 1675 cc is inserted into the lower chamber. The lower chamber is closed by returning the meter to an upright position and by clamping of the gate. The level of rapeseeds is adjusted to be equal with the gate. Seeds are added or removed as necessary. Seeds are then returned to the upper chamber, the gate is closed, and the volume standard is removed.

To determine specific volume of a bread sample, the bread sample is allowed to cool one hour after baking. The bread sample is weighed to the nearest gram and the weight is recorded. The sample is placed in the lower chamber of the bread volumeter. For bread samples in a range of 0–1325 cc, the 1675 cc standard is included in the chamber. For bread samples in the volume range of 700–2000 cc, the 1,000 cc standard is included in the chamber. For samples in the 1700 to 3000 cc range, no standard is required. Once the bread sample is positioned in the lower chamber, the gate is opened. The meter is not tapped. The level of seeds is determined and recorded. This level is designated as "V." The seeds are then returned to the upper chamber of the bread volumeter, the gate is closed and the sample is removed. The specific volume in cc per gram is equal to the volume of seeds displaced measured in cc minus the volume of standard in cc (0 if no standard was used). This difference is divided by the weight of the sample in grams. The test was performed in triplicate and a loaf of bread with a volume of about 1000 cc and an average specific volume of 4.04 cc per gm. This analysis yielded a standard deviation of 0.10 cc per gram.

In another embodiment of the method of the present invention, a hydrophobic plasticizer such as oil is added to the dough in addition to water. The oil plasticizes the dough. The oil is added to supplement the water so that the reduced water concentration does not adversely impact plasticity.

It has been found that by combining selected solutes, the initial freezing point of the dough can be significantly decreased without adversely affecting the dough characteristics or the properties of the product baked from the dough. In one embodiment, the selected solutes include a combination of colligative freezing point depressing solutes which follow Raoult's Law under ideal conditions and non-colligative freezing point depressing solutes which do not follow Raoult's Law under ideal conditions.

Colligative freezing point depressing solutes are defined for purposes of the present invention as those solutes which follow Raoult's Law in an ideal solution, which essentially states that one mole of a solute will have the same freezing point depression effects in a given environment regardless of the type of solute used. For example, one mole of sucrose will have about the same freezing point depression effects as one mole of glucose. Examples of solutes which follow Raoult's Law under ideal conditions which can be used in the dough of the present invention include ethanol, glycerol and other polyols, salts, and simple carbohydrates such as glucose and sucrose.

Non-colligative freezing point depressing solutes are defined for purposes of the present invention as those solutes which do not follow Raoult's Law in an ideal solution, but surprisingly do show freezing point depression effects in a dough system. Examples of solutes which exhibit non-colligative properties in an ideal solution and can be used as freezing point depressing solutes in the dough of the present invention include high molecular weight maltodextrins, hydrocolloid polymers and polyvinylpyrolidones.

However, relying on a single solute, whether colligative or non-colligative, such as glucose, would be expected to adversely affect the dough performance, particularly the dough's rheology and proofing capabilities. Solutes typically negatively affect yeast performance, so a high solute concentration is adverse to a yeast's proofing performance. Yeast cells, however, are the desired choice as a leavening agent because of the taste, smell and other organoleptic properties imparted by the yeast. High solute concentrations would also be expected to adversely affect proofing by chemical leavening systems by interfering with carbon dioxide generation and gas bubble formation when the dough is proofed.

By combining solutes, the method of the present invention significantly reduces the amount of ice formed in the dough upon freezing without adversely affecting other properties of the dough.

In addition to the solute effects, the overall water content of the dough was reduced by adding less solvent water and replacing the water with plasticizers. Some of the solutes added function as plasticizers, such as ethanol and glycerol. In addition, a fat or, preferably, an oil, was added to make up for the amount of water reduced. By reducing the amount of water and increasing the amount of plasticizer, the rheology of the present invention dough was substantially the same as rheology for a conventional dough. This outcome was surprising, since the oil added as a plasticizer is hydrophobic, whereas water is a hydrophilic plasticizer. The combined solutes and reduced water content, in addition to the carbon dioxide environment, permits the dough of the present invention to be frozen, without adversely affecting the qualities of a product baked from the dough.

As discussed, a conventional yeast leavened dough has a freezing point at about 25° F. (−4° C.). Upon exposure to frozen storage conditions, a conventional dough contains about 20 grams of ice per 100 grams of dough. The baked specific volume of a product baked from a conventional dough that has been frozen is less than about 3 cc/gram as shown in FIGS. 1 and 2.

A dough made with the method of the present invention, containing both colligative and non-colligative solutes and packaged in a carbon dioxide environment, has an initial freezing point preferably less than the frozen storage temperature, and can be as low as about −18° C. Upon frozen storage, the dough of the present invention contains at most about 10 grams of ice per 100 grams of dough, preferably between 3–5 grams of ice per 100 grams of dough. A product baked from a frozen dough of the present invention has a baked specific volume similar to that of a product made from a dough that has not been frozen, which is preferably greater than about 4.4 cc/gram.

Concentration ranges for ingredients in the dough of the present invention are shown in the following Table 4:

TABLE 4

| INGREDIBNT | WT - % RANGE |
|---|---|
| Ethanol | 1–3 (pref. closer to 1.5) |
| Glycerol or Polyol | 0–2 |
| Simple Carbohydrate | 0–10 (depending on kind of dough) |
| Liquid Oil or Shortening | 0–8 |
| Maltodextrin | 0–10 |

EXAMPLE FIVE:

One example of an ingredient formulation for an ice-resistant dough, identified as "NO ICE" as compared to a conventional dough, identified as a "CONTROL" dough, is shown in Table 5. This example is presented to illustrate one embodiment of the present invention and is not intended to limit the scope of the present invention.

TABLE 5

| INGREDIENT | CONTROL | "NO ICE"** |
|---|---|---|
| Flour | 59 | 54 |
| Water | 34 | 23 |
| Oil | — | 5 |
| Shortening | 2 | 2 |
| Salt | 1 | 1 |
| Sucrose | 2 | 8 |
| Ethanol | — | 2 |
| Glycerol | 0 | 4 |
| Yeast | 2 | 4 |
| Initial Freezing Point (C.) | −4 | −17 |
| Approximate Proof Time | 30 Min. | 120 Min. |

**The No Ice Dough is most preferably packaged in a $CO_2$ atmosphere.

The ice-resistant dough described in Table 5 had a solute concentration that was higher than the conventional dough as is shown in Table 5. For instance, in a comparison of percent amounts of sucrose, the conventional dough had a concentration of 2%, versus 8% by weight for the ice-resistant dough of the present invention.

Also, as can be seen in Table 5, the percent of water in the ice-resistant dough was significantly lower than in the control dough, 23% versus 34% of the dough by weight.

Further, the ice-resistant dough included ingredients of ethanol and glycerol that are not typically added to a conventional dough. It was noted that the proof time of the ice-resistant dough was substantially longer, up to four times longer than the proof time for a conventional dough that had not been frozen. The longer proof time is believed to result from the inhibition of yeast activity by the increased concentrations of sucrose, ethanol and the polyols.

Once the dough was proofed and as the dough was cooled, carbon dioxide solubility in the aqueous phase of the dough increased. Carbon dioxide has a tendency to dissolve in the dough. Because the water in the dough does not change phase, to form ice, carbon dioxide dissolved in the water component of the dough did not substantially escape from the dough. Additionally, since the water in the dough does not form ice, the dough matrix is not dehydrated by vapor phase ice deposition in the gas cells of the dough. Thus, the integrity of the dough matrix was preserved at temperatures as low as 0° F. (−18° C.).

Ethanol, in one embodiment, was added to the dough of the present invention. In another embodiment, such as for a sponge dough process, the ethanol was produced in situ by the yeast added to the dough for fermentation.

The specific volume of bread baked from the ice-resistant dough prepared in accordance with the method of the present invention was virtually the same as the specific volume of bread baked from a conventional bread dough that had never been frozen. Results from a comparative study of specific volumes of baked doughs are shown in FIG. 1.

As can be seen in FIG. 1, bread baked from the unfrozen conventional dough had a specific volume of 4.4 cm$^3$ per gram. This dough was freshly prepared utilizing a conventional formulation and did not undergo storage at temperature depression prior to baking.

The dough of the present invention was prepared and stored at −18° C. (0° F.) for a time ranging from one to twelve weeks in an atmosphere of carbon dioxide. Remarkably, as is shown in FIG. 1, the specific volume of bread baked from the dough of the present invention after twelve weeks of storage was at least as good as the fresh dough.

Even more surprising is a result that the dough formulation of the present invention produced a bread that tasted just as good as a freshly conventionally prepared baked bread dough. This result has been quantified in a taste test presented as Example Six and Table 7, in which 72 people tasted four samples of cinnamon rolls prepared from baked doughs.

EXAMPLE SIX:

The baked doughs are described below.

SAMPLE ONE—This sample was a pre-proofed frozen dough containing ethanol and stored in a container containing carbon dioxide. The dough was stored at a temperature of 0° F.

SAMPLE TWO—This sample was an ice-resistant dough of the present invention. Ingredients for this dough are described in Table 6. The dough included alcohol such as ethanol and was stored in a package that contained carbon dioxide. This dough was stored at a temperature of 0° F.

SAMPLE THREE—This dough was a conventional frozen dough stored at 0° F.

SAMPLE FOUR—This dough was a refrigerated dough product stored at 40° F.

Ingredients other than sugar and salt were added, combined and mixed for four minutes. Then, the sugar and salt were added to the mixture and mixed for three and one-half minutes. The dough was proofed until the volume approximately doubled, at room temperature. The dough was then sheeted to 2.5 millimeters. The filling was added at about 15% by weight. The target weight of each roll was about 80 grams.

Sample sizes were substantially identical. The doughs were baked under substantially identical conditions.

TABLE 6

| INGREDIENT | PERCENT OF TOTAL DOUGH WEIGHT |
|---|---|
| Flour | 50.21 |
| Water | 16.85 |
| Sucrose | 9.00 |
| Fresh Eggs | 7.20 |
| Compressed Yeast | 4.00 |
| Butter - High Flavor | 6.00 |
| Ethanol | 2.00 |
| NFDM - High Heat | 2.00 |

TABLE 6-continued

| INGREDIENT | PERCENT OF TOTAL DOUGH WEIGHT |
|---|---|
| Salt | 1.00 |
| Glycerol | 1.25 |
| Dough Condition | 0.39 |
| Yellow/Red Premix | 0.10 |

The taste test results for the baked bread dough samples are shown in Table 7. Table 7 separates overall impression, flavor, visual appearance and texture from overall sweetness, cinnamon flavor strength and amount of filling. For the criteria of overall desirability, flavor, visual appearance and texture, the higher the rating, the more favorable the rating. The same letter of one of A, B, or C, indicates that the values are not significantly different at a 95% confidence level.

Surprisingly, the ice-resistant dough of the present invention, when baked into a cinnamon roll, had the most favorable overall rating of any of the baked doughs tested. The dough of the present invention, when baked, also had the highest flavor rating measured. The visual rating of the baked dough of the present invention was within a range of ratings for all four baked dough sample types tested. The texture rating was within the range of all dough samples tested. The baked dough of the present invention also had a very favorable rating in terms of overall sweetness, cinnamon flavor strength, and amount of filling.

TABLE 7

| | Liking | | | |
|---|---|---|---|---|
| Product | Overall | Flavor | Visual | Texture |
| Sample One | 6.8 (A) | 7.0 (A) | 7.8 (A) | 6.8 (A) |
| Sample Two | 6.7 (A,B) | 7.0 (A) | 7.1 (B) | 6.7 (A) |
| Sample Three | 6.2 (A,B) | 6.7 (A,B) | 6.0 (C) | 6.9 (A) |
| Sample Four | 6.0 (B) | 6.4 (B) | 7.2 (B) | 6.5 (A) |

NOTES:
1) A,B,C; Same letter indicates that the values are not significantly different at the 95% confidence level.
2) All products were prepared in site and served within 20–35 minutes after baking.

The dough of the present invention is stored in a container that can maintain a carbon dioxide environment over several weeks. Preferred packaging includes hermetically sealed containers made of materials having barrier properties capable of retaining a gaseous carbon dioxide environment therein over the expected shelf life of the dough. It is preferred that the package volume be in excess of the dough product contained in the container. If there is any excess volume, commonly referred to as headspace, it should contain at least about 50% by volume of carbon dioxide. The carbon dioxide gas can be added by gas flushing of the package as is known.

The foregoing description of the specific embodiments revealed the general nature of the present invention so that others can, by applying current knowledge, readily modify and/or adapt the invention for various applications. It is to be understood that the phraseology or terminology employed herein is for the purpose of description and not of limitation. The invention is not limited by the specific disclosure, except to the extent that such limitations are found in the claims.

What is claimed is:

1. A method for making a bread dough that substantially retains rheological properties of an unfrozen dough at a temperature as low as 0° F. (18° C.) and that has a specific volume and flavor, when baked after frozen storage at freezing temperatures, that is substantially the same as bread baked from a dough not subjected to freezing temperatures, comprising:

preparing a bread dough that includes a hydrophobic plasticizer effective for depressing an initial freezing point of the dough while retaining rheological properties of the dough and specific volume of an unfrozen baked dough and further including a solute having one or more of a colligative freezing point effect and a non-colligative freezing point effect; and storing the bread dough in an atmosphere enriched in a carbon dioxide concentration of at least about 50% by volume.

2. The method claim of 1 wherein the solute includes sucrose.

3. The method of claim 2 wherein the sucrose is added in a concentration of about 8% by weight of the dough.

4. The method of claim 1 wherein the solute includes a polyol.

5. The method of claim 4 wherein the polyol includes ethanol.

6. The method of claim 4 wherein the polyol includes glycerol.

7. The method of claim 1 wherein the solute includes one or more of the group consisting of maltodextrin, hydrocolloid polymers and polyvinylpyrolidones.

8. The method of claim 1 and further including proofing the bread dough prior to storage in the carbon dioxide enriched atmosphere.

9. A dough product made by the method of claim 1, the dough having a sucrose concentration of about 8% by weight of the dough.

10. The method of claim 1 and further including baking the stored dough to make a baked bread.

11. The method of claim 1 and further including proofing the bread dough prior to storage in the carbon dioxide enriched atmosphere.

12. A bread dough resistant to freezing at a temperature as low as 0 degrees Fahrenheit, comprising:

a hydrophobic plasticizer; and a solute having a colligative freezing point effect and one or more solutes having a non-colligative freezing point effect wherein one of the solutes having a non-colligative effect is sucrose having a concentration greater than 6% by weight of the bread dough.

13. The dough of claim 12 wherein the sucrose concentration is 8% by weight of the dough.

14. The dough of claim 12 wherein the solute having a non-colligative freezing point is selected from a group consisting of maltodextrin, hydrocolloid polymers, polyvinylpyrolidones, and combinations thereof.

15. The dough of claim 12 wherein the solute having a colligative freezing point effect includes a polyol.

16. The dough of claim 15 wherein the polyol includes ethanol.

17. The dough of claim 15 wherein the polyol includes glycerol.

18. The dough of claim 12 wherein the dough, when baked, has a specific volume that is substantially the same as a dough which has not been subjected to frozen storage.

19. A kit, comprising:

a bread dough resistant to freezing at a temperature as low as 0 degrees Fahrenheit, comprising a hydrophobic plasticizer; a solute having a colligative freezing point effect and a solute having a non-colligative freezing point effect;

a container for containing the bread dough; which has an added carbon dixoide concentration of greater than 50% by volume.

* * * * *

UNITED STATES PATENT AND TRADEMARK OFFICE
CERTIFICATE OF CORRECTION

PATENT NO. : 5,804,233
DATED : September 8, 1998
INVENTOR(S) : David J. Domingues et al.

It is certified that error appears in the above-indentified patent and that said Letters Patent is hereby corrected as shown below:

Column 19, line 4, delete "(18° C.)" and insert --(-18° C.)--.

Signed and Sealed this

Twelfth Day of January, 1999

Attest:

Attesting Officer

*Acting Commissioner of Patents and Trademarks*